(No Model.)
D. A. TOMPKINS & F. OLIVER.
OIL SEED MEAL HEATING MACHINERY.
No. 336,175. Patented Feb. 16, 1886.
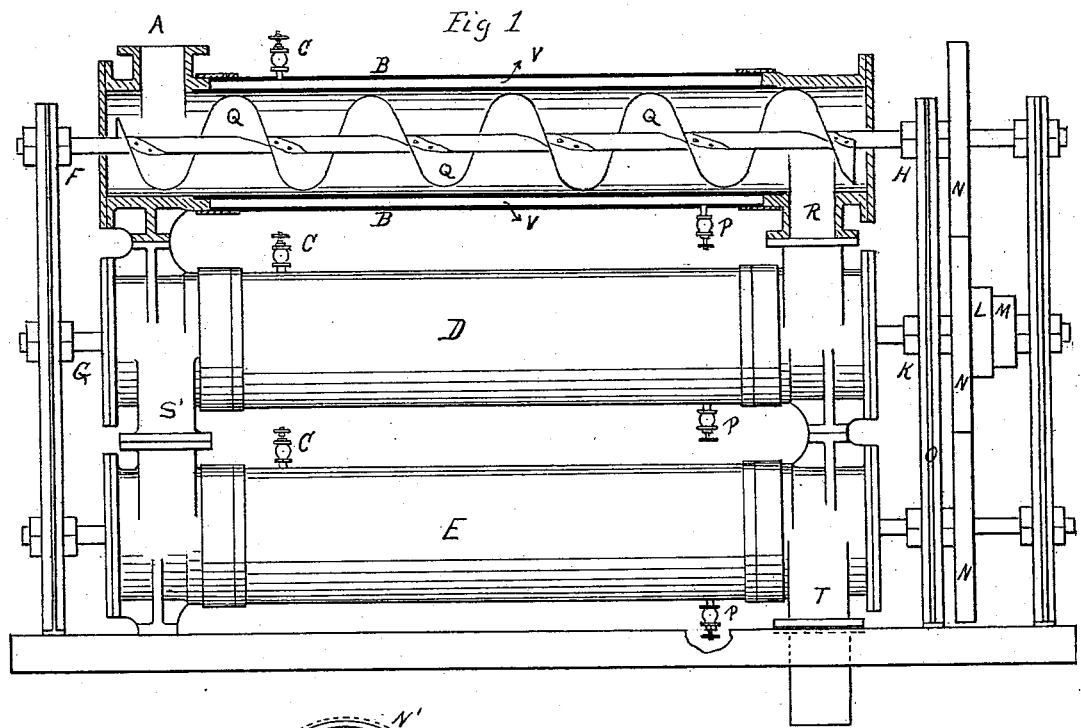
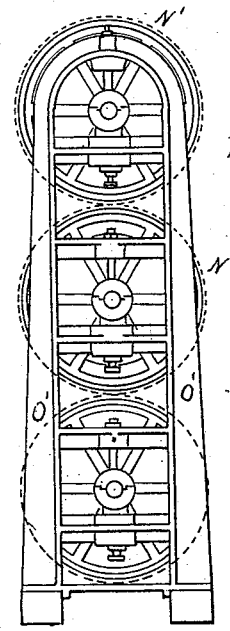
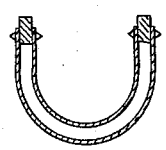
Witnesses
George Oliver
D. S. C. Anderson
Inventors
Dan'l A. Tompkins
Frederick Oliver

UNITED STATES PATENT OFFICE.

DANIEL A. TOMPKINS AND FREDERICK OLIVER, OF CHARLOTTE, N. C.

OIL-SEED-MEAL-HEATING MACHINERY.

SPECIFICATION forming part of Letters Patent No. 336,175, dated February 16, 1886.

Application filed October 18, 1884. Serial No. 145,868. (No model.)

*To all whom it may concern:*

Be it known that we, DANIEL A. TOMPKINS and FREDERICK OLIVER, citizens of the United States, residing in Charlotte, county of Mecklenburg, and State of North Carolina, have invented a new and useful Machine for Heating Oil-Seed or Oil-Seed Products Preparatory to Pressing the Oil out of it, of which the following is a specification.

Our invention consists of one or a series of pipes or conveyer-troughs within which is a spiral conveyer, and about which, in the case of the pipe or pipes, is an annular space for holding steam, and in the case of the trough there are hollow walls and bottoms, also for holding live steam.

The object of the invention is to heat the meal uniformly, and to keep it stirred with little power to prevent burning. We attain these objects by the mechanism illustrated in the accompanying drawings, in which—

Figure 1 is an elevation of the entire machine, showing a section of the top conveyer and tubes. Fig. 2 is an end elevation, showing the housing for holding the bearings of the spiral conveyers and the gearing by which all the other conveyers are driven from the one to which the power is applied. Fig. 3 shows a sectional view of the shape in which a conveyer-trough may be made instead of tubular.

Similar letters refer to similar parts in the views.

To make the machine of pipes or tubes, as shown in Fig. 1, we would screw the inner pipe into the castings A and K, having an outer pipe with steam-joints also at the castings. These joints on the outer pipe may be made with the casting by having long threads on each end of the pipe and having a sleeve and jam-nut screwed on the pipe before it is put over the inner pipe. Then, when the inner pipe is in place, screw the sleeve so as to lap on the casting and the pipe, making a steam-tight joint on the casting, then jam the nut back of it on the pipe, having previously packed the joint. The arrangement of the two pipes is shown at section B B.

At V V the space for steam is indicated. Steam is supplied to this space through the valve C from a pipe leading from some steam-supply. The water of condensation is led away through the valve P, and is either discharged or conveyed to the boiler through a steam-trap or by gravity, according to the height of the heater.

Q Q, &c., represent the spiral conveyers. L and M are pulleys for driving these spiral conveyers, and U U U are geared wheels for driving those which do not receive power from the belt from the one which does.

O' is the housing for bearings, shown in elevation, Fig. 2.

To operate the machine, oil-seed or oil-seed product is put into it at A while the machine is being driven. It is conveyed through the length of the pipe by the movement of the spiral conveyer to the opening R, where it falls into the conveyer-tube D, and is likewise conveyed through it to space or opening S, thence through the lower pipe, and out at T. Each of the pipes having an annular space of steam, the oil seed or product in passing through is gradually and uniformly warmed, and at the same time is constantly kept stirred or in motion, which prevents burning or scorching from lying still against the sides of the hot pipe.

By the means of this machine we obtain a continuous feed and a continuous discharge. The discharge may be directly into the former box or into some receptacle.

The machine may consist of any number of conveyer-pipes or conveyer-troughs.

A variation in the length of time required for the product to pass through a machine may be made by the use of cones or cone-pulley where the power is applied.

We claim as our invention—

1. In an apparatus for heating oil-seed or oil-seed meal, a series of connected but independently-jacketed conveyers adapted to feed the material operated upon from one to another and alternately in opposite directions, and to discharge the same continuously, in combination with means, substantially as described, whereby any one or all of the jackets of said conveyers can be supplied with steam or its equivalent for heating said material, substantially as described.

2. In an apparatus for heating oil-seed, the combination of the independently-jacketed screw-conveyers, geared together to be rotated in alternately opposite directions, and means for supplying steam to any one or all of the jackets of said conveyers independently each of the others, substantially as described.

D. A. TOMPKINS.
FRED. OLIVER.

Witnesses:
GEORGE OLIVER,
D. H. ANDERSON.